(12) United States Patent
Nonclercq et al.

(10) Patent No.: US 7,710,420 B2
(45) Date of Patent: May 4, 2010

(54) METHOD AND SYSTEM FOR GRAPHICALLY NAVIGATING AMONG STORED OBJECTS

(75) Inventors: Arnaud Nonclercq, Suresnes (FR);
 Guillaume Delarue, Courbevoie (FR)

(73) Assignee: Dassault Systemes, Suresnes Cedex (FR)

( * ) Notice: Subject to any disclaimer, the term of this patent is extended or adjusted under 35 U.S.C. 154(b) by 9 days.

(21) Appl. No.: 11/312,804

(22) Filed: Dec. 20, 2005

(65) Prior Publication Data
US 2006/0218478 A1 Sep. 28, 2006

Related U.S. Application Data

(63) Continuation-in-part of application No. 11/167,364, filed on Jun. 27, 2005.

(51) Int. Cl.
 *G06T 11/20* (2006.01)
 *G06F 3/048* (2006.01)
(52) U.S. Cl. .................. 345/440; 345/619; 345/441; 715/788; 715/764; 715/853
(58) Field of Classification Search ............ 345/440, 345/619, 441; 715/788, 853, 848, 764
 See application file for complete search history.

(56) References Cited

U.S. PATENT DOCUMENTS

| | | | | |
|---|---|---|---|---|
| 5,606,654 | A | * | 2/1997 | Schuur ............... 345/440 |
| 6,122,634 | A | | 9/2000 | Brodsky et al. |
| 6,237,006 | B1 | * | 5/2001 | Weinberg et al. ......... 715/853 |
| 6,609,122 | B1 | | 8/2003 | Ensor |
| 6,628,304 | B2 | | 9/2003 | Mitchell et al. |

(Continued)

FOREIGN PATENT DOCUMENTS

KR 10-2000-0072012 12/2000

(Continued)

OTHER PUBLICATIONS

Hicks, B.J., et al.. "An integrated modelling environment for the embodiment of mechanical systems", COmputer-Aided Design, vol. 34, issue 6, May 2002, pp. 435-451.*

(Continued)

*Primary Examiner*—Chante Harrison
(74) *Attorney, Agent, or Firm*—Baker & Hostetler LLP

(57) ABSTRACT

The invention is directed to a product life cycle management (PLM) system, comprising a database storing objects, preferably 3D objects, and relations between said objects. The PLM system provides a graphical user interface suitable for displaying to a user a graphical representation of a hierarchy of stored objects. The graphical user interface is adapted, upon selection of a displayed object by a user, to display objects related to the selected object. At a given level in the hierarchy, displayed objects are distributed according to a respective weight. The weight of a displayed object depends on the number of its descendants in the hierarchy, which are displayed in said graphical representation. The invention makes it possible to navigate in a database of a PLM system, storing notably complex modeled objects through interrelated data. Thanks to the principle of the weight dependence discussed above, the solution further allows the user to comprehend its progression through the organized data as well as the relations between objects and this, in an easy and intuitive way.

20 Claims, 18 Drawing Sheets

U.S. PATENT DOCUMENTS

| | | | |
|---|---|---|---|
| 6,750,864 B1 * | 6/2004 | Anwar | 345/440 |
| 6,982,708 B1 * | 1/2006 | Mah et al. | 345/418 |
| 2002/0054166 A1 | 5/2002 | Decombe | |
| 2002/0145623 A1 | 10/2002 | Decombe | |
| 2004/0036721 A1 * | 2/2004 | Anderson et al. | 345/848 |
| 2004/0090472 A1 * | 5/2004 | Risch et al. | 345/853 |
| 2004/0181554 A1 * | 9/2004 | Heckerman et al. | 707/104.1 |
| 2005/0248560 A1 | 11/2005 | Agrawala et al. | |
| 2005/0273730 A1 * | 12/2005 | Card et al. | 715/853 |
| 2007/0018983 A1 * | 1/2007 | Vimme | 345/440 |

FOREIGN PATENT DOCUMENTS

| | | |
|---|---|---|
| KR | 10-2002-0021074 | 3/2002 |
| KR | 10-2004-0005903 | 1/2004 |
| WO | WO-98/22866 A1 | 5/1998 |

OTHER PUBLICATIONS

Van den Berg, "Web-based collaborative modelling with SPIFF", Sep. 2000, Thesis, Delft University of Technology, pp. 1-58.*

"Matrix One: Matrix Basics, Version 6", MatrixOne Inc., 1998, XP002308421, pp. 1-47.

Carriere, Jeromy, et al., "Research Report: Interacting with Huge Hierarchies: Beyond Cone Trees", Information Visualization, IEEE Comput. Soc. Oct. 30, 1995, pp. 74-81.

Gomez, Julian E., et al., "The Digital Space Shuttle, 3D Graphics, and Knowledge Management", Proceedings of the Siggraph 2003 Conference on Sketches and Applications, in Conjunction with the $30^{th}$ Annual Conference on Computer Graphics and Interactive Techniques, Jul. 27, 2003, p. 1, XP002308422.

McKinney, Kathleen, et al., "Visualization of Construction Planning Information", 1998 International Conference on Intelligent User Interfaces, IUI '98, XP002111495, pp. 135-138.

Robertson, G., et al., "Cone trees: animated 3D visualizations of hierarchical information", In Proc. CHI' 91, Human Factors in Computing Systems, 1991, pp. 189-202.

Wilmot Li, et al., "Interactive image-based exploded view diagrams," Proceedings of the 2004 conference on Graphics interface, May 17-19, 2004, London, Ontario, Canada.

Elena Driskill, et al., "Interactive design, analysis, and illustration of assemblies," Proceedings of the 1995 symposium on Interactive 3D graphics, Apr. 9-12, Monterey, CA.

European Search Report dated Dec. 1, 2004.

* cited by examiner

METHOD AND SYSTEM FOR GRAPHICALLY NAVIGATING AMONG STORED OBJECTS

CROSS REFERENCE TO RELATED APPLICATIONS

This application is a continuation-in-part of U.S. application Ser. No. 11/167,364, filed on Jun. 27, 2005, which claims priority to European patent application no. 04076865.7 filed on Jun. 28, 2004. The current application also claims priority to European patent application no. 04293051.1, filed on Dec. 20, 2004, which claims priority to European patent application no. 04076865.7 filed on Jun. 28, 2004.

FIELD OF THE INVENTION

The invention relates to the field of computers programs and systems, and more specifically to product life cycle management solutions, which contain databases of data representative of modeled objects.

BACKGROUND OF THE INVENTION

A number of systems and programs are offered on the market for the design of parts or assemblies of parts, such as the one provided by DASSAULT SYSTEMES under the trademark CATIA. These so-called computer-aided design (CAD) systems allow a user to construct and manipulate complex three dimensional (3D) models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are essentially specifications of geometry. Specifically, CAD files contain specifications, from which geometry is generated, from geometry a representation is generated. Specifications, geometry and representation may be stored in a single CAD file or multiple ones. CAD systems include graphic tools for representing the modeled objects to the designers; these tools are dedicated to the display of complex objects—the typical size of a file representing an object in a CAD system being in the range of a Mega-byte for part, and an assembly may comprise thousands of parts. A CAD system manages models of objects, which are stored in electronic files.

There also exists product life cycle management solutions (PLM), such as the one provided by DASSAULT SYSTEMES under the trademarks CATIA, ENOVIA and DELMIA; these solutions provide a Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the systems deliver an open object model linking products, processes, resources to enable dynamic, knowledge-based product creation and decision support that drives optimized product definition, manufacturing preparation, production and service. Such PLM solutions comprise a relational database of products. The database comprises a set of textual data and relations between the data. Data typically include technical data related to the products said data being ordered in a hierarchy of data and are indexed to be searchable. The data are representative of the products, which are often modeled objects.

One of the problems in such PLM solutions is that the users of the system may wish to display the products and, if necessary, have a 3D graphic representation of the products. DASSAULT SYSTEMES provides under the name DMU Review a series of CAD tools for allowing the user of PLM solution to handle a 3D graphic representation of the products managed in the system. These tools rely on the use of digital mock-ups which are pre-computed from CAD representations of the products. These tools further provide a restricted set of graphic views of the products; specifically, the DMU systems usually provide a 3D representation of the products. In the system sold under the name DMU Navigator, the user may display a 3D representation of a complex product; the display further comprises a hierarchical tree representing the various products or parts of said displayed product. This system provides to the user 3D representations of the products stored in the database. However, navigation in this system may still be improved.

With CAD tools such as DMU review or DMU Navigator, the user is only able to navigate among the parts or the products that have been loaded in the system. Therefore, the scope of the navigation is very limited since if the user wishes to navigate among all the available products or assemblies, he has to load all those products or assemblies, which is impossible due to hardware constraints and transactions issues.

As a matter of facts, DMU products are limited as regards the scope of navigation. Specifically, the user first opens a DMU session, where a limited list of parts and assemblies is defined. This makes it possible for the system to compute and store the representations that will thereafter be used in the DMU navigation. Navigation is limited to the list of parts and assemblies defined when the DMU session is opened.

Furthermore, the user may for instance wish to know where a given part is also used, i.e. in which other modeled object it is embedded. Actual CAD tools enable a user to navigate between parts or products mainly according to the "is composed of" relation. Databases used in Product Data Management (PDM) systems enable to make queries on all types of relation between parts or product and the scope of navigation of the databases is the widest possible. As a matter of fact, the user can have access to all the parts, products or assemblies.

Nevertheless, databases do not allow the user to easily navigate since the data do not have a graphical representation. Data are identified by file names or types and those names may not be relevant enough to identify precisely the items that the user is looking for.

The problem of navigating in organized data has been extensively discussed in the literature.

For example, U.S. Pat. No. 6,628,304 provides a method and apparatus which present hierarchical data to a user via a graphical user interface. A preferred embodiment represents hierarchical data related to a computer network and is provided to a user as part of a network management software application. In the interface, hierarchical data is represented by nodes, beginning with one or more top nodes and extending into lower hierarchical levels by the display of child nodes, child's child nodes, and so forth. The arrangement of nodes on the graphical user interface is such that scaling portrays the various hierarchical levels, and nodes do not spatially interfere with one another. Navigation through the hierarchical data is provided by allowing the user to select any visible node, at which point a zoom-in or zoom-out view to the selected node as a centrally located node on the interface is performed. Child nodes at lower hierarchical levels that were not visible before selection are then made visible up to a predetermined number of levels within the hierarchy.

WO-A-98/22866 concerns an interface for an interactive display device, comprising at least two levels each with at least two objects capable of being displayed on the interactive display device, the interface further comprising means for successively displaying, in a same level, the whole set of objects, by displaying each object once. The objects at one level comprise at least one set of icons to be displayed on an interactive display device, and comprising a plurality of icons, each icon capable of being actuated for accessing information, and comprising an image, preferably a legend, and further preferably a pictogram representative of the nature of the information which is accessed when the icon is actuated.

The article of Robertson, G., Mackinlay, J., and Card, S. "Cone trees: animated 3D visualizations of hierarchical information". In Proc. CHI'91, Human Factors in Computing Systems (1991), pp. 189-202, discusses techniques of visualization of hierarchical information structures.

The methods, apparatus or techniques discussed in the above documents does however not allow for navigating in a database of a product lifecycle management system, that is, comprising complex modeled objects stored in the database, to be graphically represented.

US-A- 2002/0054166 provides a method for displaying a source node having connections to contained nodes and linked nodes peripherally within and around the source node to which they are connected, computing a focus position for each of the contained and linked nodes; displaying a first contained node at an inclusion start angle, and displaying a first linked node at an adjacency start angle.

US-A- 2002/0145623 is directed to a user interface animated and configurable to optimize, facilitate and simplify displaying on a display device and exploring via user input a hierarchy of information accessible by an electronic device. The underlying method comprises for example: displaying a plurality of nodes in viewing region; receiving user input selecting one of the plurality of nodes displayed in the viewing region; centering the selected one of the plurality nodes in the viewing region, the centered node being a focus node. The plurality of nodes comprises preferably a plurality of hierarchically related nodes.

Though the above interface allow for navigating in organized data, they are not appropriate with respect to PLM requirements, where data are representative of complex modeled object to be graphically represented. In particular, the centering or focus proposed does not allow the user to clearly keep in mind its progression through the organized data. Such interfaces are further not suitable for allowing the user to distinguish between different relations linking the data.

Thus, according to the limitations of the existing solutions shortly discussed above, there is a need for an improved navigation solution, allowing a user to navigate in a database in a product lifecycle management system, storing notably complex modeled objects via interrelated data. The solution should preferably be user-friendly and should allow the user to locate and display objects in an easy and intuitive way. The solution should further allow the user to keep in mind its progression through the organized data and, if necessary, to distinguish between different types of relations linking the data.

SUMMARY OF THE INVENTION

In one embodiment, the invention provides a product lifecycle management system, comprising: a database storing modeled objects and relations between said objects; a graphical user interface suitable for displaying to a user a graphical representation of a hierarchy of stored objects; wherein the graphical user interface is adapted, upon selection of a displayed object by a user, to display objects related to the selected object; wherein, at a given level in the hierarchy, displayed objects are distributed according to a respective weight; and wherein the weight of a displayed object depends on the number of descendants of said object in the hierarchy which are displayed in said graphical representation.

In other embodiments, the product lifecycle management system according to the invention may comprise one or more of the following features:
  the graphical user interface is adapted to display a graphical cue representative of a hierarchy of a displayed object and the descendants of said object in the hierarchy, which are displayed in said graphical representation;
  the displayed objects have a rendering size depending on their respective weight;
  the weight of a displayed object depends on the size of descendants of said object in the hierarchy, which are displayed in said graphical representation;
  the graphical user interface is adapted to display the objects using an unique scale for all objects;
  the graphical user interface is adapted to display a 3D representation of objects; and
  the graphical user interface is adapted, upon selection of a displayed object by a user, for morphing from a first representation of the displayed object to a representation of objects related to the displayed object.

The invention further proposes a method for navigating in a database of a product lifecycle management system, the database storing modeled objects and relations between said objects, the PLM system comprising a graphical user interface suitable for displaying to a user a graphical representation of a hierarchy of stored objects, the method comprising the steps of: selecting a first object and a first relation; finding descendants of said first object in the hierarchy, which descendants comprise second objects related to the first object according to the first relation; displaying a representation of the first object comprising the second objects; selecting one of the displayed second objects and a second relation; finding descendants of the selected second object, which descendants comprise third objects related to the selected second object through the second relation; displaying a representation of the first object, comprising the second and third objects; wherein: objects displayed are distributed according to a respective weight; and the weight of an object depends on the number of descendants of said object in the hierarchy, which are displayed in said graphical representation.

In other embodiments, the method according to the invention may comprise one or more of the following features:
  objects are displayed as 3D objects;
  the step of selecting a first object and a first relation comprises selecting a first layout, and wherein the representation of second objects is a representation in the first layout;
  the step of selecting one of the displayed objects and a second relation comprises selecting a second layout, and wherein the representation of third objects is a representation in the second layout;
  the layout is selected among: linear layout, with objects represented in perspective view exploded along a line; in-place layout; circular layout, with objects represented in exploded perspective distributed on a disk; 2D layout of 3D miniature representations;
  the layouts are animated;
  the relations comprise at least two of the following relations: a relation "is comprised of", a relation "where used", a relation "in contact with"; a relation "in clash with"; a relation "impact with"; and the method according to the invention further comprises a step of computing and storing 3D representations of objects.

The invention still concerns a computer program implementing the method of the invention.

A system embodying the invention will now be described, by way of non-limiting example, and in reference to the accompanying drawings.

DETAILED DESCRIPTION OF THE INVENTION

Figure 1:
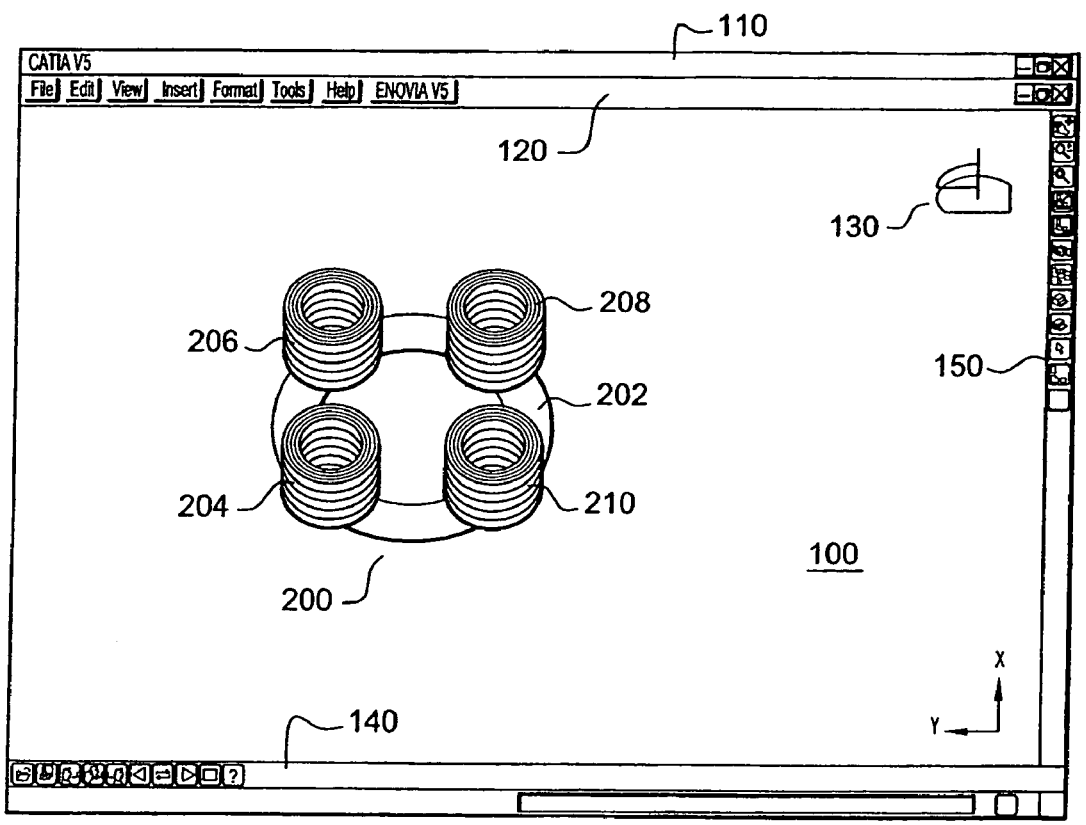
FIGS. 1 to 3 are examples of views of explanatory objects, displayed according to an "in-disk" layout.

The invention is directed to a PLM system, comprising a database storing objects, preferably 3D objects, and relations between said objects. The PLM system provides a graphical user interface suitable for displaying to a user a graphical representation of a hierarchy of stored objects. The graphical user interface is adapted, upon selection of a displayed object by a user, to display objects related to the selected object. At a given level in the hierarchy, displayed objects are distributed according to a respective weight. The weight of a displayed object depends on the number of its descendants in the hierarchy, which are displayed in said graphical representation. The invention makes it possible to navigate in a database of a PLM system, storing notably complex modeled objects through interrelated data. Thanks to the principle of the weight dependence discussed above, the solution further allows the user to comprehend its progression through the organized data as well as the relations between objects and this, in an easy and intuitive way.

Regarding the databases used in PLM solutions: as well known to the person skilled in the art, such databases comprise a set of data, as well as relations between the data of the set. The relations are often indexed, for the purpose of accelerating searches within the database. From a file standpoint, a relational database is not comprised of a single file but uses a complex file system for storing the various data and relations. By "a database storing objects", it should be understood that some of the data in the database are representative of modeled objects. Such objects can either be modeled objects of products or parts or objects such as a manufacturing process comprising various steps, resources such as robots for carrying out the manufacturing steps and so forth. In a PLM solution, the set of data would comprise, for example, for a modeled object:

part number;
manufacturing or procuring information on the product or modeled object;
references to drawings or CAD files for the products;
versioning data (history of design iterations, history of released versions)
configuration data (to explore the various configurations of an object).

Relations in a PLM solution would comprise notably a "is comprised of" relation; this relation makes it possible to create clusters or subassemblies of products.

Relations could also comprise a relation "is used in", also called "where used" relation, which is representative of all subassemblies where a given product is used. Relations could also comprise a relation "is in contact with", which allow the user to manage contacts between the various products in the database. Relations may comprise the relation "in clash with", which indicates that the various data describe objects which overlap or collide each other. This may help in finding design problems. Relations may comprise a part dependency; this relation is representative of the impact graph, when a part is built from another one, which is also known as "relational design". Last, relations may exist which are representative of attributes of the various data; these attributes may include usual attributes in PLM solution, e.g. the material forming the objects, the origin of the objects (provider, manufacturer, etc.) and the like.

Regarding the notion of hierarchy: strictly speaking, a hierarchy is the same as a rooted tree structure, e.g. every element, except one, has a single predecessor. However, the term should here be understood in a more loosely way, so as to include any partially ordered system or a tangled hierarchy. A tangled hierarchy is an inheritance graph, e.g. an object can belong to more than one set or superset. In particular, the various user selectable relations make that an object can belong to different sets or, in close relation, have multiple parents.

Figure 2:
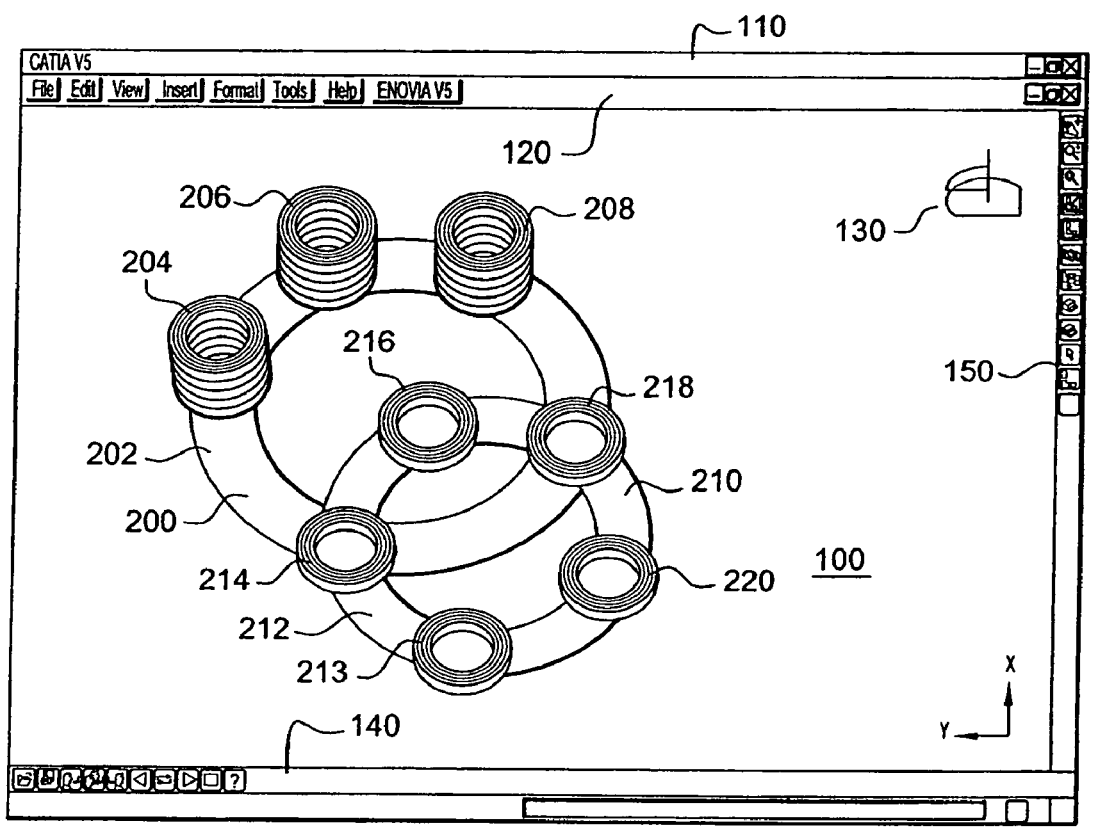
Figure 3:
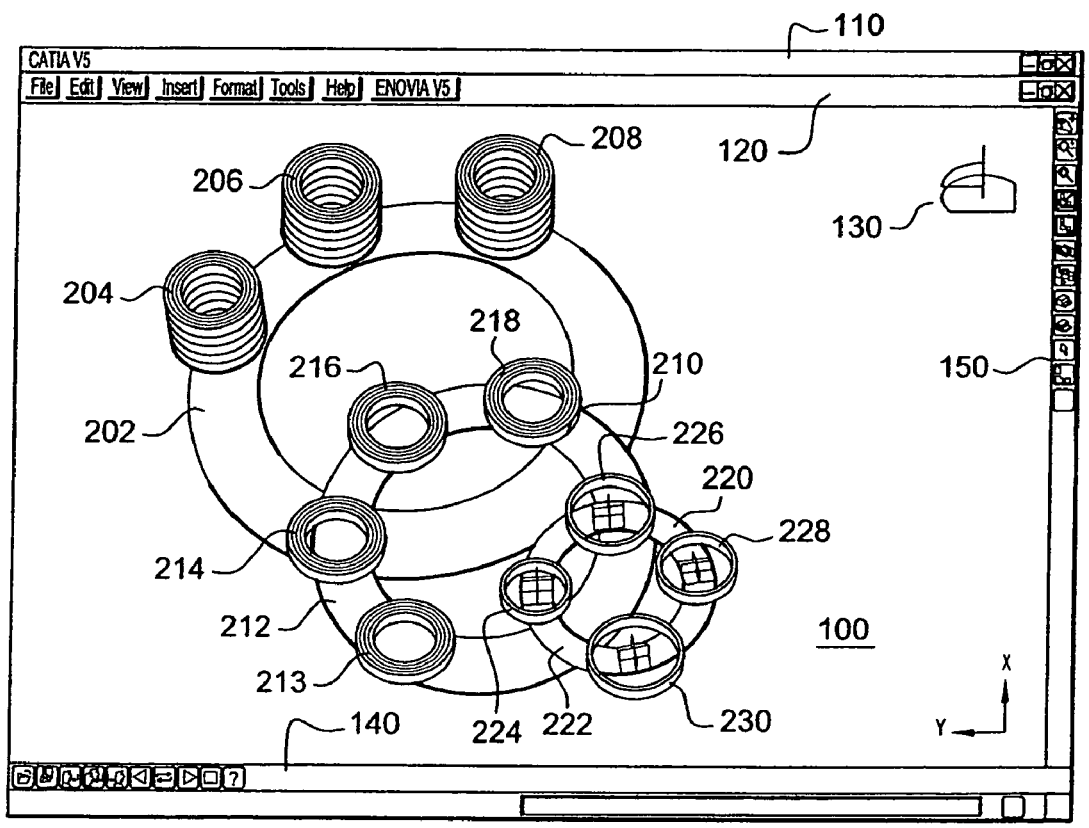

FIGS. 1 to 3 are examples of views of explanatory objects, displayed according to an embodiment of the invention.

In reference to FIG. 1, the GUI 100 is suitable for displaying to a user a graphical representation of objects, that is, from the data representative of such objects, which are stored in the database. The GUI 100 is further suitable for displaying a graphical representation of a hierarchy of stored objects.

The invention makes it possible for the user to navigate among the data representative of objects, via the GUI, by displaying representations of the data, preferably 3D representations. The displayed data may for example be selected by a user according to the various relations stored in the database.

To this respect, the user may for example select a first data and a first relation. This may be done thanks to the use of a tree which may be displayed within the GUI 100. It is also possible for the user to select the first data thanks to another type of user interface, for instance by inputting identification information for the first data, by selecting the first data in a list, or the like. The relation may be selected thanks to any kind of user interface such as a combo-box, an icon, a special command or a right click. Notice that this applies for the other types of user selection that will be mentioned hereafter, unless otherwise specified.

In response to the selection of the first data and first relation, the system displays, via the GUI, a representation of objects. In this case, the displayed objects are actually objects represented in the database by second data related to the first data according to the first relation. For this purpose, the system uses the relational property of the database for selecting all data in the database that are related to the first object in the first relation. Once the second data are identified, the modeled objects which are represented by these second data are displayed.

In the explanatory example proposed in FIG. 1, the user may for instance select a given first object (not displayed in FIG. 1) consisting of a set of cylinders and the relation "is composed of". In this case, the PLM system would search the database for all data—parts or products—that compose the selected first object. As a result, the PLM system displays, via the GUI, the second objects 204-210 related to the first object 200 via the above relation. The first object 200, e.g. the set of cylinder in the example of FIG. 1 as well as FIGS. 2 and 3, is an exemplified object used for an explanatory purpose only. This modeled object comprises second objects 204-210, consisting of superimposed sets of concentric cylinders.

Selection of the relation, for example "is composed of", may possibly occur from a toolbar provided in the GUI 100 (for example from toolbar 140).

Several types of layout may be envisaged, which are user selectable. Examples of layout are briefly discussed now; they will be discussed in details in reference to FIGS. 4-16. The layout may be a usual 3D representation of the object, as assembled; this may be called "in-place" layout. The various second objects may be else separated in an exploded perspective view; the layout may be expanded (or exploded) along a given line, the direction of which may be selected by the user; this may be called a "in-line" or "linear" layout. The layout may be exploded along directions from a given point—e.g. a centroid of the represented assembly or part, or the centre of the represented assembly or part. Such a layout makes it easier for the user to identify and select the various second objects. Another possible layout is a miniature layout of the various objects. One could for instance use a 2D layout of 3D miniature representations of objects.

As in the example of FIG. 1, second objects 204-210 may be displayed as distributed over a disk or circle 202—so as to obtain a "in-disk" or circular layout; such a layout eases the understanding of the model, is useful for the user to comprehend the perspective and also facilitates selection of further data. The disk can be viewed as a graphical representation of a relation between the displayed objects. This disk 202 further links objects belonging to a same first level (according to the previously selected relation). Let us call it "level 1".

The layouts, in particular the disk 202, may be animated, if necessary. Thus, when the user changes the layout, or selects a given layout, the various objects move progressively. For example, parts 204-210 may be rotated together with the disk 202 around a virtual disk axis. This helps in understanding the position of the various objects and in the viewing of said objects.

The type of layout displayed to the user may be preset or may be selected by the user. One advantageous solution is to allow the user to set a default type of view used for all displays. When a given layout is displayed, the user may then be allowed to change the default type of layout to another type.

Selection of the layout may for example be operated by first right-clicking the object, whereby a drop-down list appears, and selecting the desired field in the list.

Preferably, once a relation and layout have been selected by the user, the same layout will be applied to this relation, by default. When choosing another type of relation, another layout can be selected, which will apply to the new relation selected.

In addition, the 3D representation of each object (part or product) may be pre-computed, if necessary. This reduces computation time. Pre-computing the 3D representation is possible, at least for some of the representations that are expected to be repeatedly used in the database. This could for instance be the fact of 3D representations of the subassembly. Such pre-computed representations may be computed off the fly and may be stored for access by the system. If a given 3D representation is to be displayed, it would first be searched among the representations already stored; if the representation to be displayed is not present, it would then be computed.

Still in reference to FIG. 1, the exemplified GUI 100 may be a typical CAD-like interface, having standard menu bars 110, 120, as well as bottom and side toolbars 140, 150. Such menu- and toolbars contain a set of user-selectable icons, each icon being associated with one or more operations or functions, as known in the art.

Some of these icons 150 are associated with software tools, adapted for editing and/or representing the displayed objects. The software tools in question may be grouped into workbenches. Otherwise put, each workbench comprises a different subset of software tools.

The GUI may further show various types of graphic tool such as the graphic tool 130, which may be manipulated by a user to ease the 3D orientation of the object 200.

Notice that the elements denoted by reference numbers 100, 110, 120, 130, 140, 150, 200 are also shown in FIGS. 2-16; they will not be further described in reference to these figures.

Now, in reference to FIG. 2, the user may select one of the displayed second objects 204, 206, 208, 210 and a second relation. The second relation may be the same as the first relation, which could for instance be a default choice. The second relation may also be different from the first relation. The second user selection may thus be similar to the first one; however, in the second one, selection can be carried out directly on the representation displayed to the user.

To this regard, a user may in operation select object 210, for example by clicking it with the mouse or just by passing over it with the mouse pointer or, still, by selecting an appropriate command from the menu bar or a pop-up icon. Other selecting means could obviously be implemented.

Then, third object related to the selected second object through the selected second relation are searched and identified by the PLM system. A representation 210 of the third object is presented to the user, according to a selected layout. Preferably, the layout is by default the same as before, though this can be changed at any moment by the user.

Note that the reference number 210 in FIGS. 1 and 2 does pertain to the same selected second object 210, that is, sets of concentric cylinders. However, in FIG. 2, the graphical representation of the selected second object has changed, compared with FIG. 1, to an exploded view of this object 210. More specifically, while the object 210 could be viewed as superimposed sets of concentric cylinders in FIG. 1, it is represented in FIG. 2 as sets of concentric cylinders distributed on a disk or circle 212. Otherwise said, the representation of the selected second object 210 in FIG. 2 includes its descendants, that is, the third objects 213, 214, 216, 218, 220.

The disk 212 is thus representative of a second level (let us call it "level 2"), wherein the second object 210 selected is exploded. Level 2 is graphically linking the third objects 213,

214, 216, 218, 220, related to the parent object 210, according to the selected second relation, that is, "is composed of" in this example.

More generally, in order to clarify the situation, let us observe that:
   level 1 is where the selected first object is exploded in second objects;
   level 2 is where the selected second object is exploded in third objects;
   and so on.

It should be appreciated that objects 204-210 are distributed on the large disk according to a respective weight and this, in reference to either FIG. 1 or 2. The weight of a displayed object 204-210 depends on the number of descendants of said object 204-210 in the hierarchy, which are displayed in the graphical representation. In particular, in FIG. 1, as no descendants of objects 204-210 is displayed, the same weight is attributed to these objects 204-210.

In reference to FIG. 2, upon user selection, the object 210 is represented as a set of its descendants; the weight attributed to the object 210 is increased, according to the number of descendants 213, 214, 216, 218, 220 displayed. Thus, it is provided more space for the object 210 than for the remaining objects 204, 206, 208. As a result, the remaining objects 204, 206, 208 are redistributed on the large disk 202, according to a same weight, smaller than that of object 210, as no descendants of the remaining objects 204, 206, 208 is displayed in the graphical representation.

Note that the size of the large circle 202 in FIG. 2 is preferably increased compared with that of FIG. 1, while the scale of the cylinder remains the same. Should this be regarded as a simple focus on the new representation of the object 210, it remains that the distribution of the cylinders 204, 206, 208 has changed.

The smaller disk 212—let us call it "intermediate disk", in view of the step to come—links objects of level 2; as such, it is representative of the second relation selected. It is worth pointing out that finding and displaying third objects related to the second object selected builds up a hierarchy between second and first objects. To this respect, the intersection of two disks 202, 212 define a cue representative of a hierarchy of the displayed object 210 and its displayed descendants 213, 214, 216, 218, 220 in the hierarchy. The view of FIG. 2 provides the user with an immediate understanding of the various relations between the displayed objects. The user benefits from the fact that the selected relations are graphically represented on the layout displayed to the user.

Turning to FIG. 3, a user might be led to select a further object 220 and relation, that is, "is composed of" in this example. In fact, this relation does not necessarily need to be selected as it is provided by default. Starting from FIG. 2, selection of object 220 switches the representation of this object to that shown in FIG. 3, that is, an "in-disk" view of the descendants 224, 226, 228, 230 of object 220. Said descendants, e.g. the fourth objects, consist of cylinders of different size and colors. Again, the descendant objects 224, 226, 228, 230 are arranged on a smaller disk 222 representative of the level 3, which provides the advantages similar to those described above for the levels 2 and 1.

According to the invention, objects 204, 206, 208 and objects 213, 214, 216, 218 of levels 1 and 2, respectively, are redistributed according to a respective weight depending on the displayed descendants. More specifically, there is more space provided to object 220 than to objects 213, 214, 216, 218, since the object 220 has displayed descendants, in contrast with objects 213, 214, 216, 218. Meanwhile, objects 213, 214, 216, 218 are preferably redistributed on a larger disk 212 (compared to the representation of disk 212 in FIG. 2), owing to the larger space provided to the object as a whole.

Similarly, there is more space left to object 210 than to objects 204, 206, 208 in the representation of FIG. 3. Preferably, the disk 202 is made larger so as to allow for a redistribution of objects 204, 206, 208.

If necessary, the scale is kept constant for all objects of all levels.

The invention makes it possible to navigate between interrelated data. Thanks to the dependence of the weight of an object on displayed descendants, the solution further allows the user to comprehend the relations between objects in an easy and intuitive way. Meanwhile, the progression of the user during the navigation is made visible while allowing the user to keep an overview on all visited data.

Notwithstanding, it may be possible to proceed to a zoom-out of the displayed objects, if necessary, when the number of displayed objects or levels becomes critical. This can be achieved either upon user action or automatically triggered based on various possible parameters such as the number of displayed levels or objects.

It is further possible to provide that the disks be independently rotated upon user action, so as to allow for a better understanding of the various relations.

Moreover, it is possible to provide that graphical indexes be embedded close to or within the displayed objects, as shown in FIG. 3, so as to ease the understanding of the geometrical situation of objects, as well as the geometrical relations between objects.

In addition, the user always has the opportunity to go back by collapsing a level. He or she may, for instance, select disk 222 and choose the "collapse" option (a right-clicking for example may display several options) to go back to the state of FIG. 2.

Figure 4:
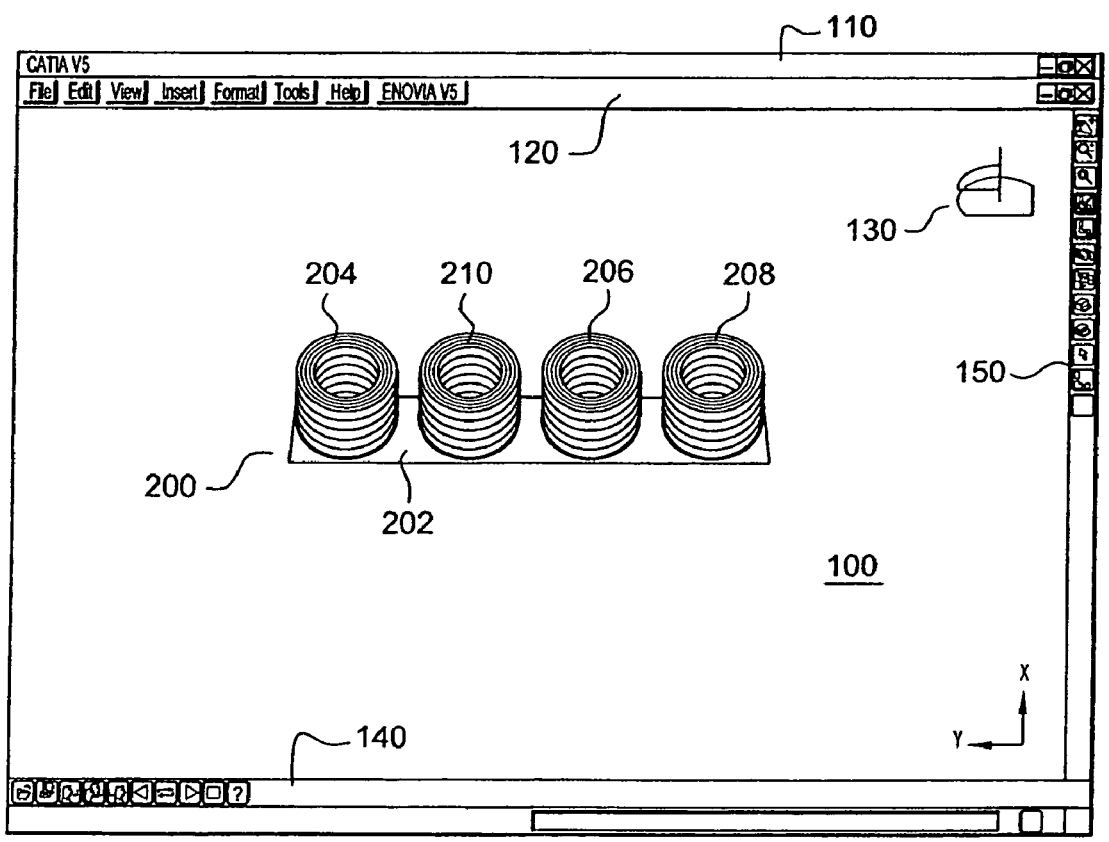
FIGS. 4 to 6 are examples of views of explanatory objects, displayed according to an "in-line" layout.
Figure 5:
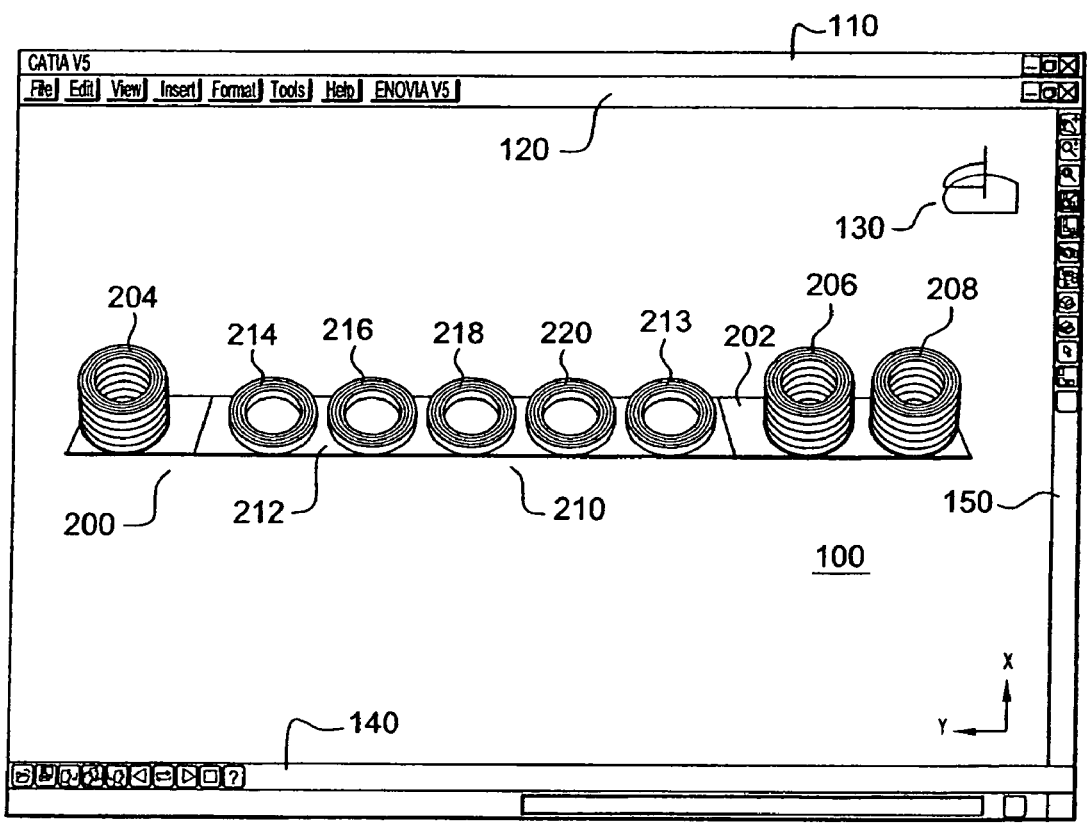
Figure 6:
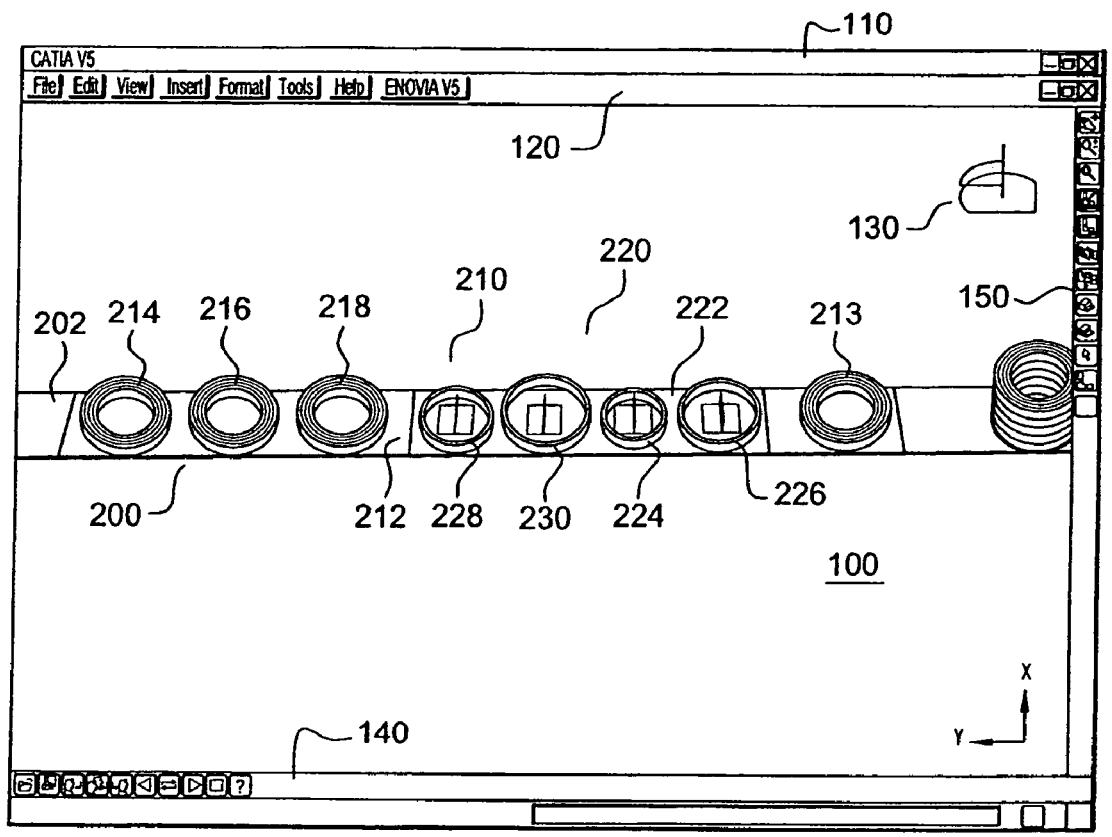

Next, FIGS. 4 to 6 are examples of views of explanatory objects, displayed according to a linear layout. In reference to these figures, the user may alternatively select an "in-line" layout, so as to make the layout expanded or exploded along a given line, the direction of which may be selected by the user. Compared with FIGS. 1 to 3, the same objects 204, 206, 208, 210 at level 1, descendant objects 213, 214, 216, 218, 220 at level 2 and sub-descendant objects 224, 226, 228, 230 at level 3 are to be successively displayed, obeying a similar mechanism. However, in contrast with the "in-disk" layout, the various objects are now successively displayed on lines or strips 202, 212 and then 222.

As provided in the example of FIGS. 4, 5 and 6, the lines or strips 202, 212 and 222 may be graphically separated, for example thanks to a thin line or a different color, so as to point the level separation.

Figure 7:
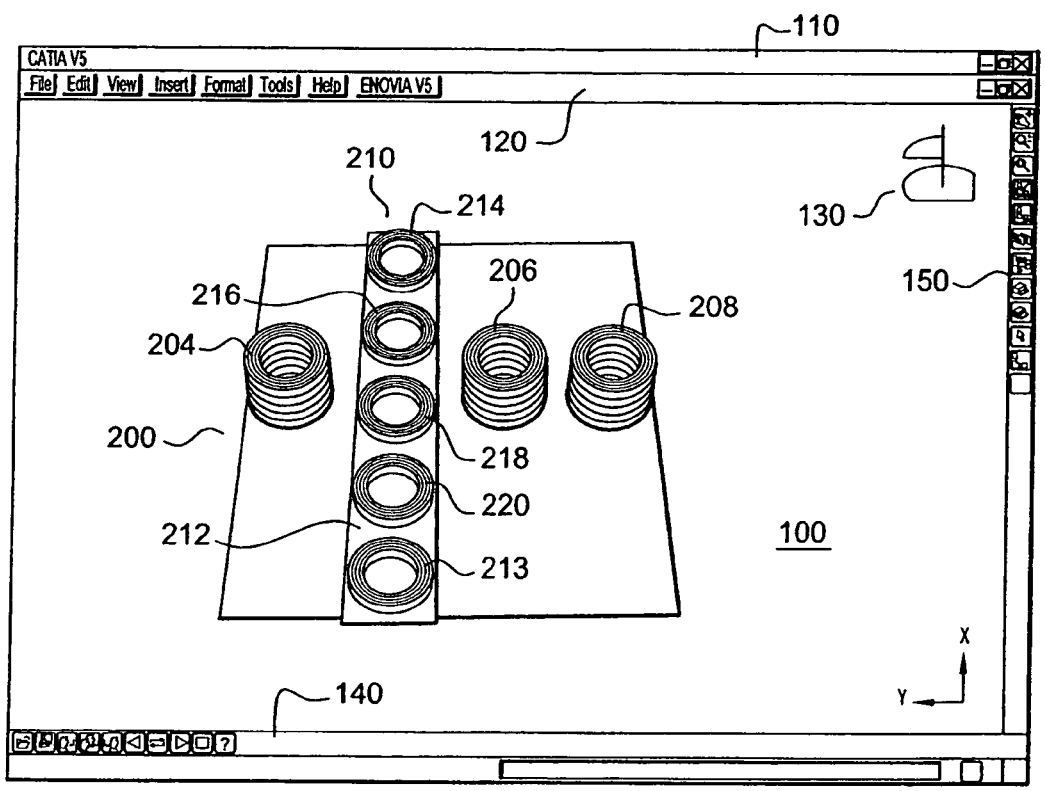
FIGS. 7 and 8 are examples of views of explanatory objects, displayed according to an "alternate in-line" layout.
Figure 8:
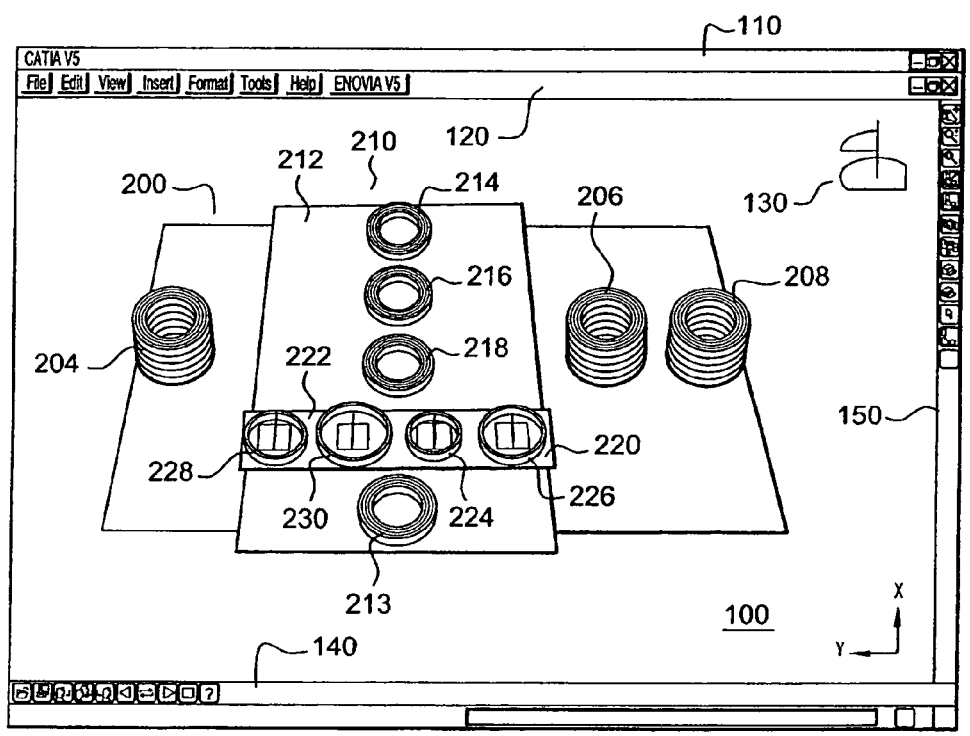

FIGS. 7 and 8 are examples of views of explanatory objects, displayed according to an "alternate in-line" layout.

As it is possible to provide that the strips be user-orientable, the user may, in operation, arrive at an alternate "in-line" layout, as illustrated in FIGS. 7 and 8, which are discussed now. In this manner, a first level 1 is graphically represented along a first direction (for example that of strip 202 in FIG. 4) while a second level 2 can be represented along a second direction, for example on the strip 212 in FIG. 7, perpendicular to the first direction. The compactness of the displayed objects is therefore increased, while allowing the user to get a clear picture of the relations between objects. At a thirds level 2 (FIG. 8), the descendant objects could be represented along a third direction, parallel to the first one but shifted. The alternate in-line representation allows the user to better comprehend the level separations.

Notice that such an alternate "in-line" layout could be provided as a basic layout type, user selectable, whereby the strips are automatically alternated at each level.

In addition, each object of a same level remains on its strip and on the strips of its ascendants, as illustrated, so as to ease the understanding of the hierarchy. For example, object 228 of FIG. 8 is placed on strips 222, 212 and 202, making it easier to understand that said object 228 is part of object 220, itself part of object 210.

Figure 9:
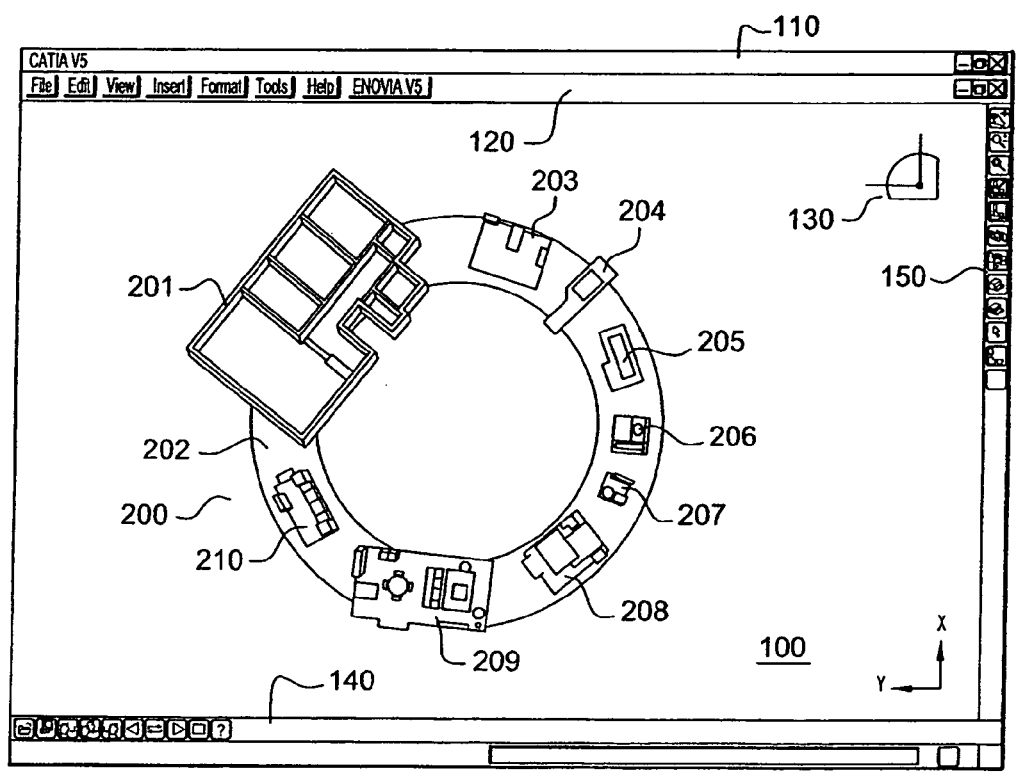
FIGS. 9 to 11 are examples of views of objects related to a flat, displayed according to an "in-disk" layout, viewed from above.
Figure 10:
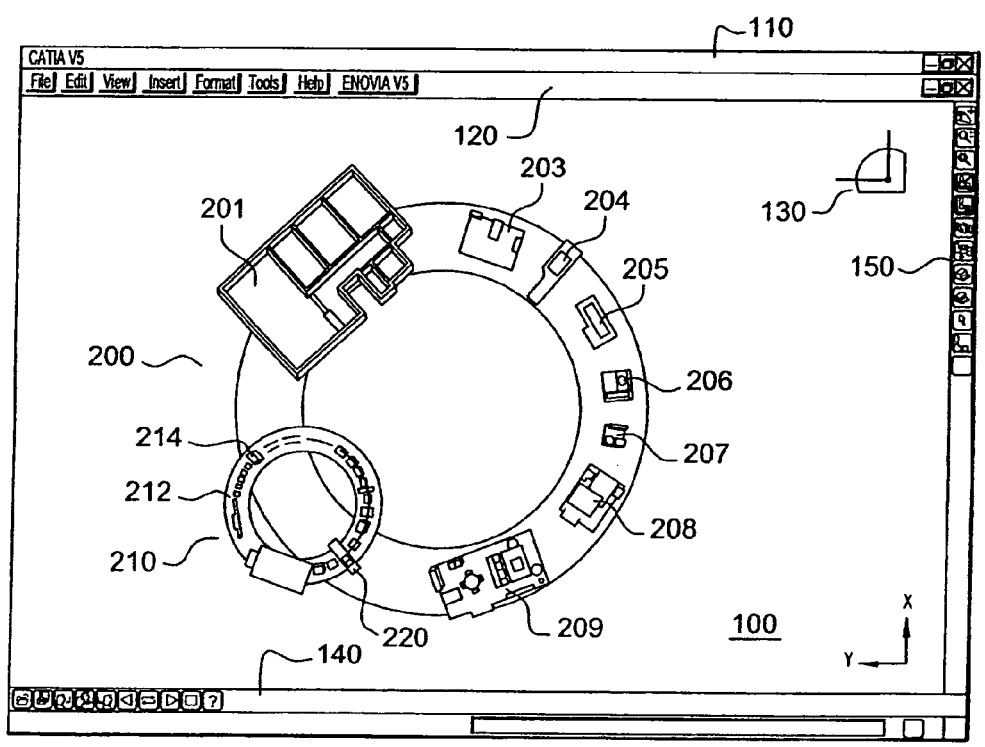
Figure 11:
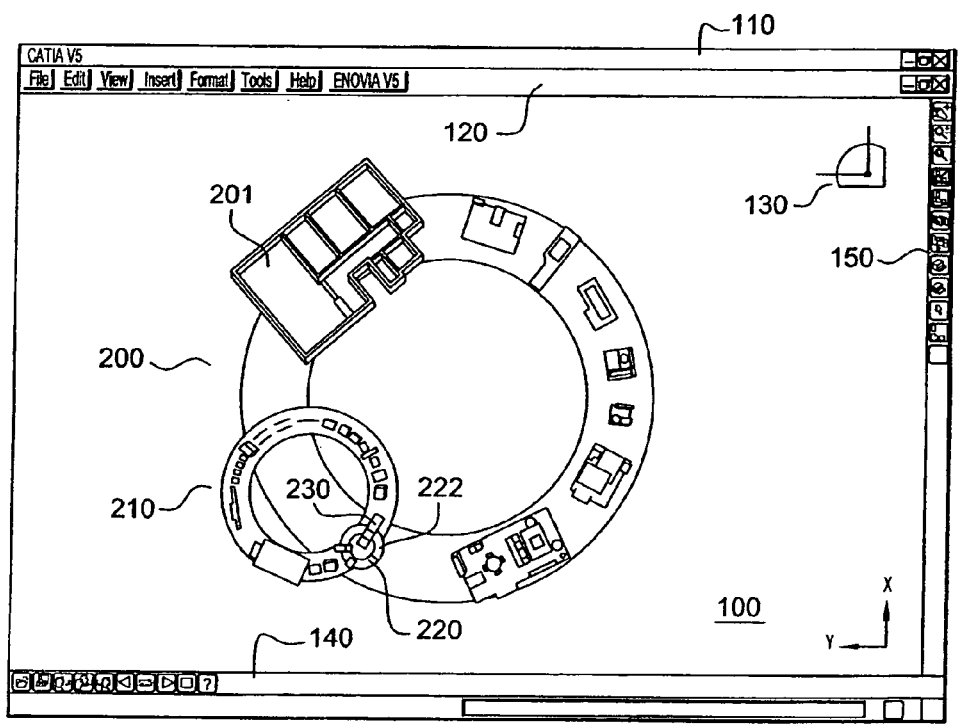

FIGS. 9 to 11 are examples of views of objects related to a flat, displayed according to an "in-disk" layout, viewed from above.

In reference to FIG. 9, a user may select a first data, for example related to a flat (first object), and a relation, here "is composed of". Notice that it is merely made use of this type of relation for the sake of understanding only; the one skilled in the art may appreciate that other type of relations may be used, such as those mentioned above. Again, the PLM system provides second data related to the first one through the selected relation. It is shown a graphical representation of various components. In the example of FIG. 9, the second data are representative of second objects related to the flat, which are exploded on a disk 202, representative of the first level (or level 1). These objects are walls 201, a first room 203, a corridor 204, a hallway 205, a bathroom 206, a pantry 207, a living-room 209 and a kitchen 210.

Such "objects" are preferably represented using a slight perspective, even if the layout is a view from above, in order to ease the understanding of the object.

Turning to FIG. 10, the user may select a given second object, for example the kitchen 210, whereupon it is exploded at level 2 on a second disk 212. The third objects descendant from the kitchen are for example a fridge 214 or a kitchen counter 220 with sink equipment. As in FIGS. 1-3, the objects displayed are redistributed according to a respective weight; which weight depends on the number of descendants of said object in the hierarchy which are displayed. Namely, more space is provided to the exploded kitchen 210, at a same given scale, compared to other objects of level 1. Meanwhile, the first disk 202 is made larger, allowing for the redistribution of other objects, as emphasized above.

Next, in reference to FIG. 11, a user may then select a particular third object, for instance the kitchen counter 220, whereby it is exploded on a new disk 222. The descendants (fourth objects), comprising for instance the counter top and a double sink 230 visible in FIG. 11, form the level 3. The object redistribution occurs substantially in the same manner as described above. Advantages similar to those described in reference to FIG. 1-3 are therefore provided here.

Figure 12:
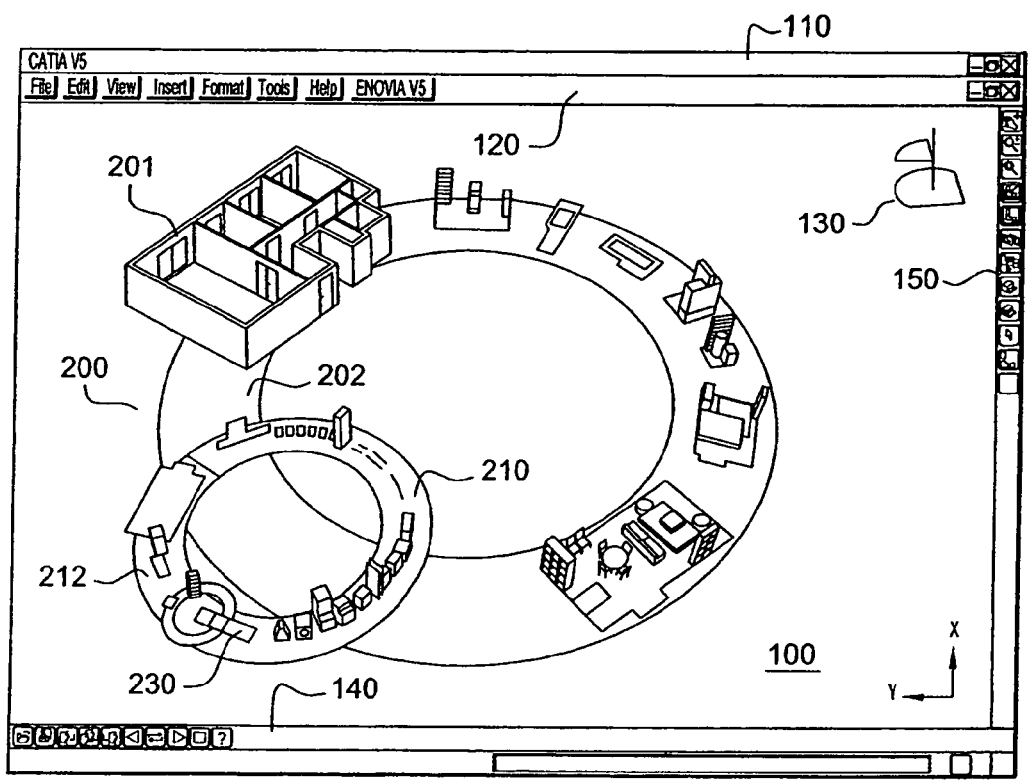
FIG. 12 is an example of a view of objects related to a flat, displayed according to same layout as in FIGS. 1 to 3.

FIG. 12 is an example of a view of objects related to a flat, displayed according to same layout as in FIGS. 1 to 3.

As an alternative to the "view from above", the user may have chosen an "in-disk" layout with perspective similar to that of FIG. 1-3. This is exemplified in FIG. 12, representing the same elements as in FIG. 12.

Figure 13:
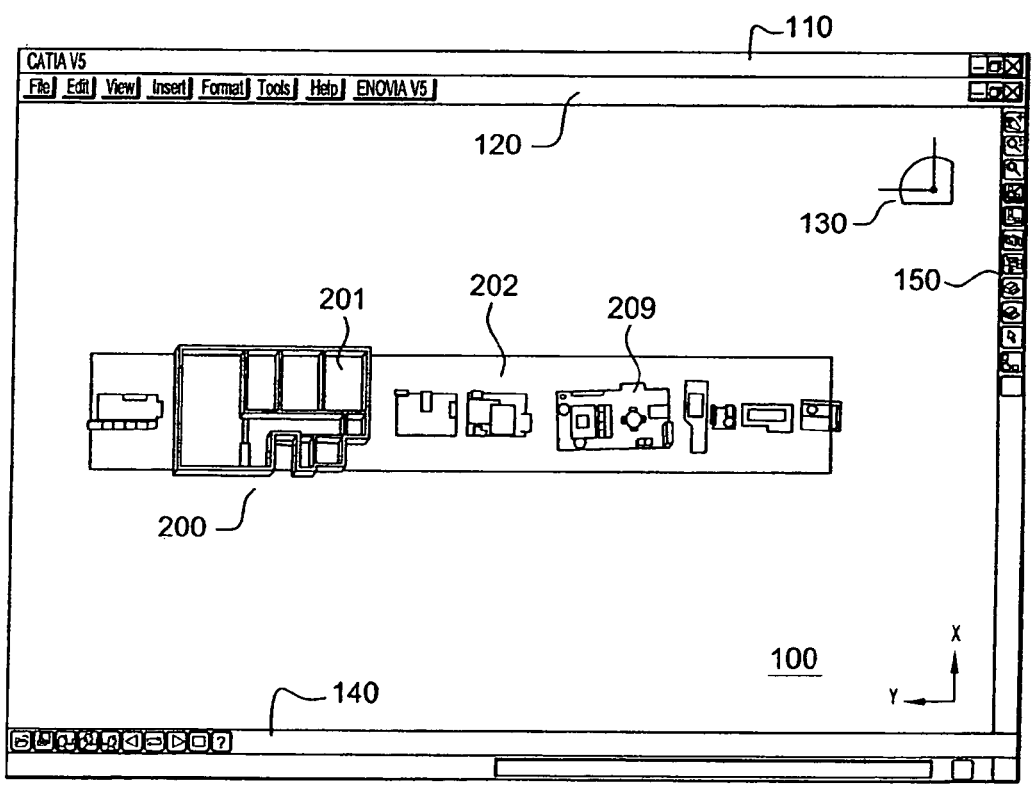
FIGS. 13 to 15 are examples of views of objects related to a flat, displayed according to same layout as in FIGS. 4 to 6.
Figure 14:
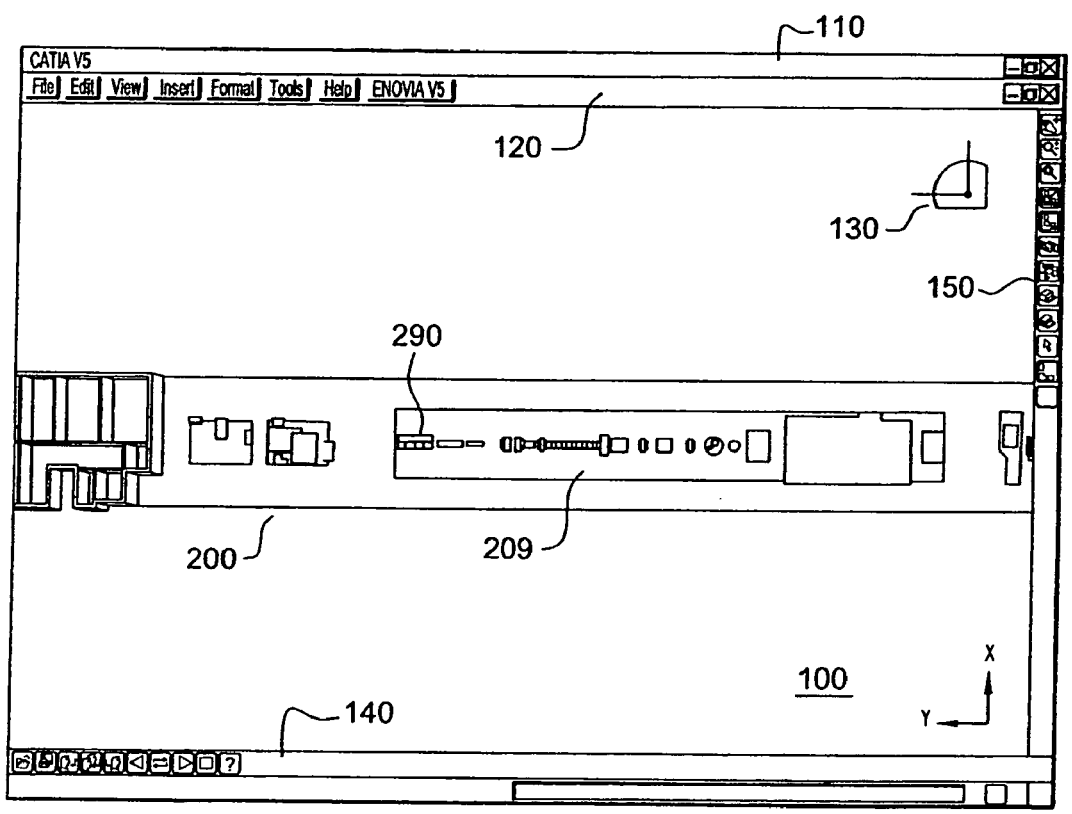
Figure 15:
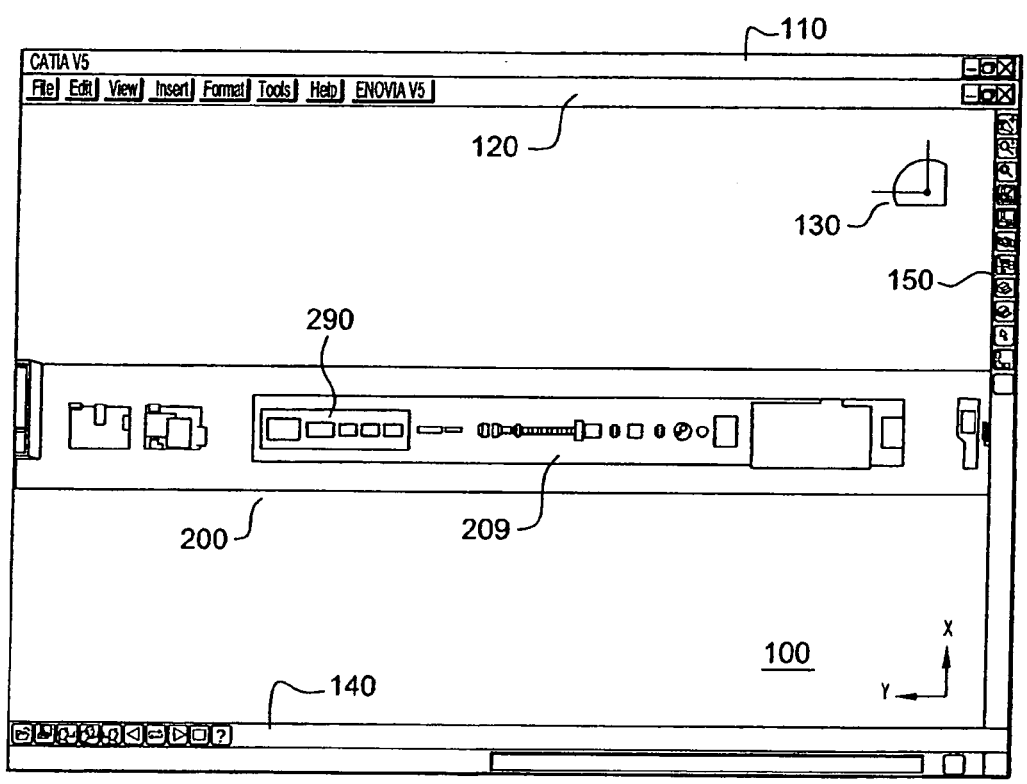

FIG. 13 to 15 are examples of views of objects related to a flat, displayed according to same layout as in FIGS. 4 to 6.

The user may also have chosen an "in-line" layout, as shown in FIGS. 13 to 15, whereby advantages similar to those described in reference to FIGS. 4-6 are provided. Notice that the example of FIGS. 13-15 illustrate a selection of the living-room 209, an exploded view of this latter being shown in FIG. 14, and then a selection of the sofa 290, exploded in FIG. 15, in contrast to the previous selection of the kitchen in FIGS. 9-11.

Figure 16:
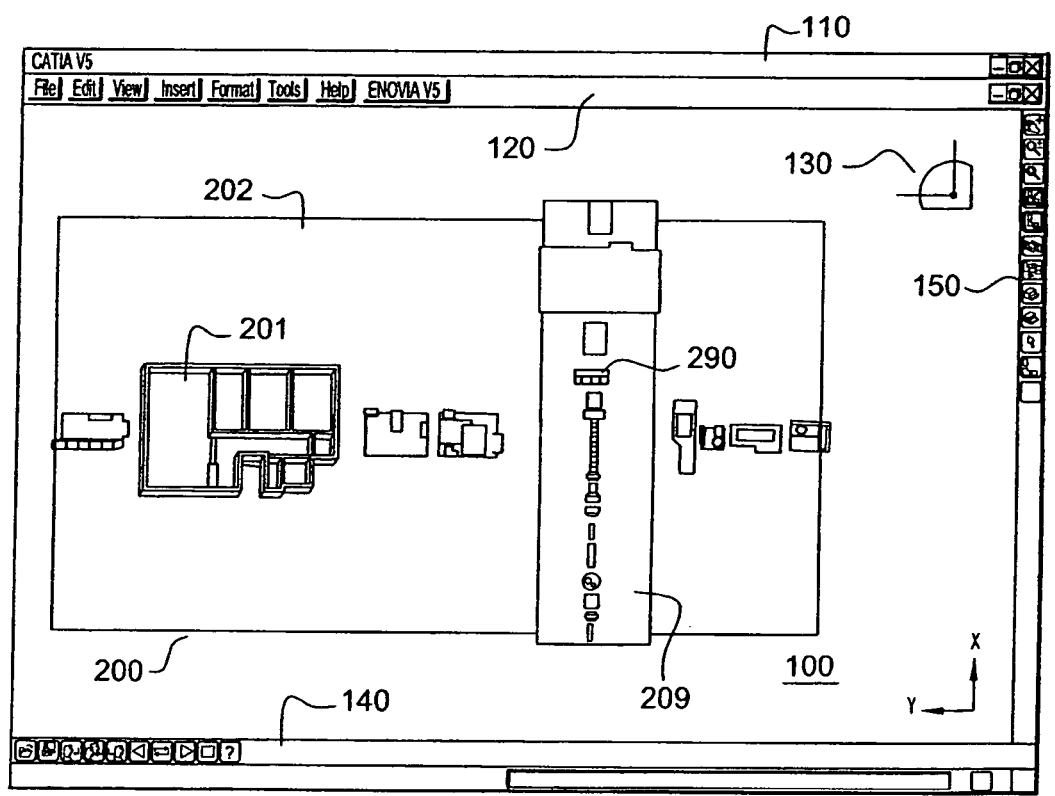
FIG. 16 is an example of a view of objects related to a flat, displayed according to same layout as in FIGS. 7 to 8.

FIG. 16 is an example of a view of objects related to a flat, displayed according to same layout as in FIGS. 7 to 8.

In reference to this figure, the user may still have chosen to compose or select an alternate "in-line" layout, so as to benefit from the respective advantages described in reference to FIGS. 7 and 8.

Regarding the example of flat-related objects, it may be appreciate how powerful querying the various relations stored via data in the PLM database can be. A user may for instance select a "provided by" or "manufactured by" relation or the like, so as to clearly sense where objects could be procured from.

To this respect, the invention makes it possible to navigate in a structured manner among non-straightforward relations, as the various possible available relations between the objects make them a priori difficult to comprehend for the user.

It may further be possible to implement the invention in a way that the objects displayed by the GUI have a rendering size depending on their respective weight, so as to render a perspective effect, for example, giving effectively the last displayed objects larger sizes compared with the first displayed ones.

According to an embodiment of the invention, the weight of a displayed object depends on the size of descendants of said object in the hierarchy, which are displayed in said graphical representation.

In another embodiment, the graphical user interface is adapted, upon selection of a displayed object by a user, for morphing from a first representation of displayed object to a representation of objects related to the displayed object.

In yet another embodiment, the number of objects displayed in the level is user adjustable, that is, not all objects need to be displayed. This can for example occur if an object comprises a lot of children according to the selected relation.

To that end, in one embodiment of the invention, there is provided means for hiding some objects within a same level. For example, a graphical object having the conformation of a tunnel may be displayed across the strip or the disk representing a level and hidden objects may come out when the user makes said strip moved along a translation or said disk rotated around its axis.

The presence or not of said graphical means enable the users to know if there are more objects in the level than those displayed.

Besides, the invention may be carried out as an add-on to existing database systems, such as PLM solutions. A possible implementation of the invention is now disclosed, in reference to FIGS. 17-20.

Figure 17:
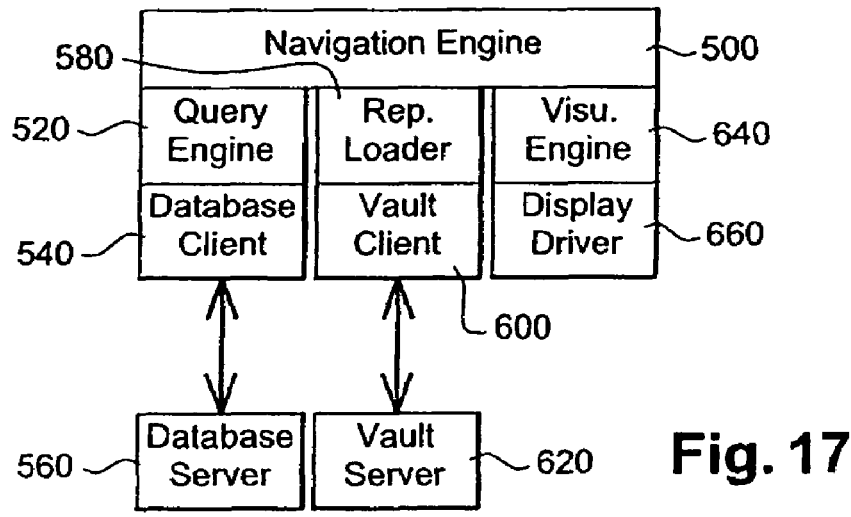
FIG. 17 is a schematic view of a software architecture usable for carrying out the invention.

FIG. 17 is a schematic view of a software architecture usable for carrying out the invention; it shows a single client, a database server 560 and a vault server. The client comprises a navigation engine 500, which manages user interface and controls components 520, 580 and 640. The navigation engine makes it possible for the user to select objects, relations, and, if available, types of layouts or views for displaying the objects. In addition, navigation engine may provide the usual types of queries available in a PLM system.

FIG. 17 further shows query engine 520, database client 540 and database server 560. Query engine 520 is controlled by navigation engine 500; it builds database statements depending on user's commands and passes the database statements to database client 540. Query engine 520 also manages query results received from database client 540.

Database client 540 is adapted to manage database server connection. It receives queries from query engine 520 and passes the queries to database server 560. It receives query results from database server 560 and passes these results to query engine 520.

Database server 560 receives queries from several database clients, such as client 540, and serves these queries. Database server is typically a relational database and may be implemented using the solutions available from IBM under reference DB2 or available from Oracle. The database could also be an object or XML database, or an application server accessing a database. Said application server may also provide processing (on the fly or asynchronously) for advanced query (proximity query, spatial query . . . ).

Apart from the additional graphical navigation functions available to the user in navigation engine 500, components 520, 540 and 560 need not differ from a relational database of the art, like the ones used in PLM solutions. Accordingly, these components are not detailed further.

FIG. 17 further shows a vault server 620, for storing and providing representations of objects contained in the database; in other words, the vault server is used as representations repository. Vault server 620 may be a file server, whereby representations could be stored in various files. It could also be implemented using a database server, using for instance "blob" (binary language object) storage. It could also use proxy and/or cache technologies. The representations of objects stored in the vault server may exists in various formats, e.g. bounding-box, polygons, bitmap images, vector images, subdivision surfaces or more generally any format known in the art. It is advantageous, as discussed below, to store various formats in the vault server, for allowing incremental loading of representations.

The vault server is addressed thanks to a vault client 600. The vault client makes it possible for the client to address the vault server for retrieving representations of objects. FIG. 17 also shows a representation loader 580. Representation loader 580 queries vault server 620, through vault client 600, for obtaining the representations of the objects to be displayed to the user. In addition, representation loader 580 manages representation incremental loading, upon receiving representations from vault client 600.

Visualization engine 640 manages representation display to the user. It addresses display driver 660, which manages the display hardware—the graphic card, in most instances. For the purpose of displaying representations on the display hardware, one may use accelerated hardware, through an OpenGL driver, or using Microsoft Direct 3D, or DirectX.

Figure 18:
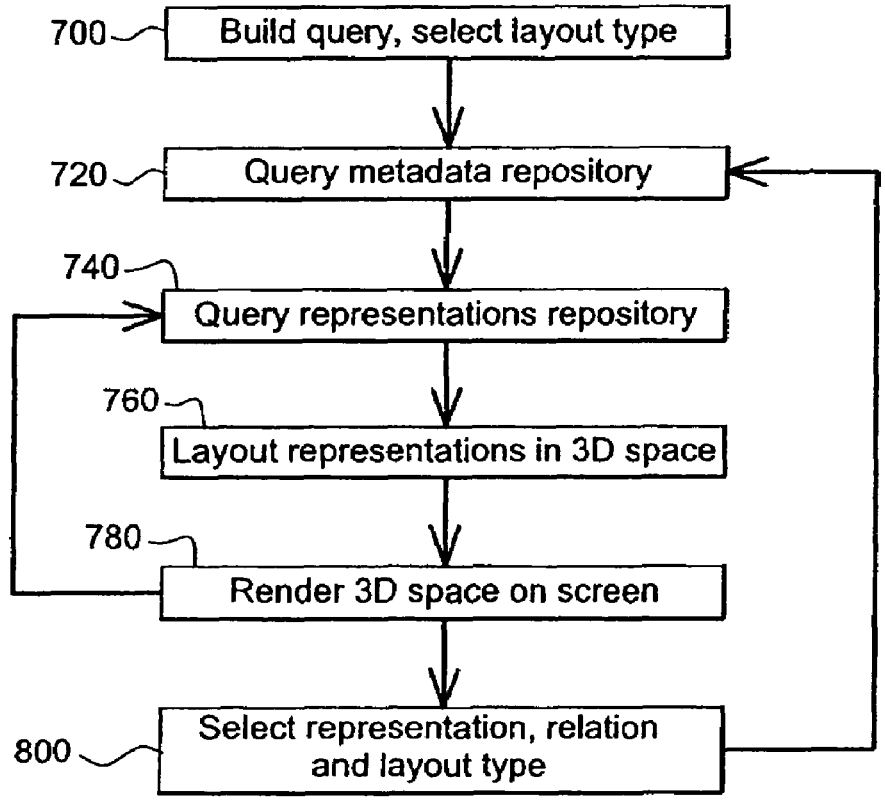
FIG. 18 is a flowchart of a process for building 3D representations for carrying out the invention.

FIG. 18 is a flowchart of a process for building a display according to the invention. The process uses the software architecture represented in FIG. 17. In steps 700-780, in response to the selection of the first data and first relation, the system displays a 3D representation of objects. In step 800, the user selects an object and a relation. Then, as depicted, the process of FIG. 18 loops to step 720 for building a new view to be displayed to the user.

More specifically, in step 700, a query is built and a layout type is selected. This may be carried out as discussed above. Selection of the query and of the layout type is allowed by the user interface of the navigation engine 500 of FIG. 17. The layout type may be one of the various types of views exemplified in reference to FIGS. 1-16.

In step 720, the database is queried, for obtaining attributes of objects matching the query built in step 700. In the architecture of FIG. 17, this step would be carried out by navigation engine 500, query engine 520, database client 540 and database server 560. As a result of step 720, there is provided a set of attributes of objects, which need to be displayed.

In step 740, the vault server is queried for obtaining the various representations of the objects, which need to be displayed. In the architecture of FIG. 17, this step would be carried out by navigation engine 500, representation loader 580, vault client 600 and vault server 620. As a result of step 740, there is provided a set of representations which correspond to the various objects to be displayed, in the select layout.

In step 760, the representations are laid out in 3D space, according to the selected layout and according to the information retrieved from the database server. In the architecture of FIG. 17, this could be carried out by navigation engine 500 and visualization engine 640. The laid-out representation is displayed to the user, in step 780, thanks to the display driver 660.

The process may then loop through steps 740, 760 and 780, for incrementally loading representations, from the small and poor formats to big and rich formats. For instance, one could first load bounding-box representations of the objects, before loading polygon representations of the objects. One could also stream representations. This makes it possible to provide to the user an almost immediate representation of the objects; even though this representation may first have a rather poor quality, the representation improves as time passes. The user is eventually provided with a more complete representation with a higher quality, without having to wait for a long time for such a representation. One may load representations as a background task, using multi-threading or asynchronous inputs/outputs. These solutions make it possible to give higher priority to database queries, so that navigation in the database does not hinder the user's work within the database.

The loop through steps 740, 760 and 780 may stop when the best and richer representations are loaded and displayed to the user.

Else, the loop through these steps may cease when the user selects one of the displayed objects and a relation; this step is represented in FIG. 18 under reference 800. The process then loops back to step 720, where the database server is again queried.

The process of FIG. 18 and the architecture of FIG. 17 use a vault server, where various pre-computed representations of the data are stored.

Figure 19:
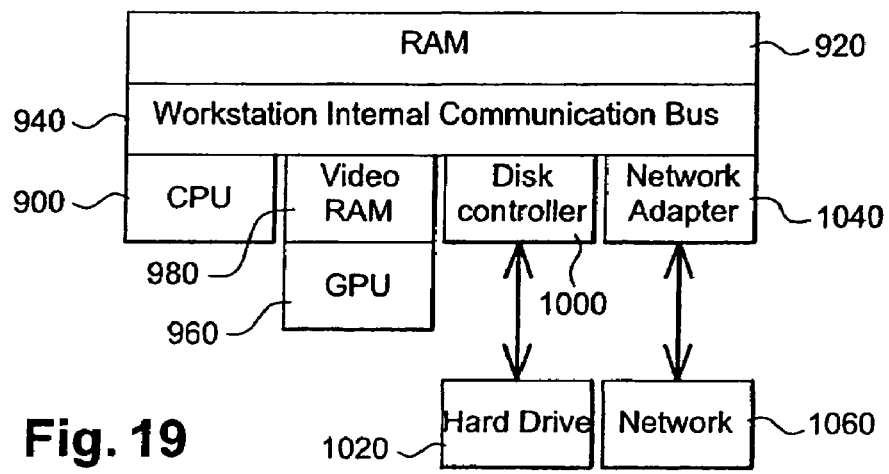
FIG. 19 is a schematic view of a client workstation architecture adapted for carrying out the invention.

FIGS. 11 and 12 are schematic views of client and network hardware architecture, adapted for carrying out the invention. FIG. 19 shows a client workstation. The workstation comprises a central processing unit 900, a random access memory 920 and a workstation internal communication bus 940 for allowing access to the random access memory. The workstation is further provided with a graphical processing unit 960, with its associated video random access memory 980. A disk controller 1000 manages accesses to a mass memory device, such as hard drive 1020. A network adapter 1040 manages accesses to a network 1060.

In operation, the various client components of FIG. 17 are processes executed in CPU 900. Network adapter 1040 is used by vault client 600 for accessing vault server 620 on network 1060 and is further used by database client 540 for accessing database server 560 on network 1060. Disk controller 1000 may be used by vault client to create a cache of representations on local mass memory device 1020; this improves performances of frequently used representations. Display driver 660 feeds video RAM 980 with the layout of representations; these are displayed thanks to the GPU 960.

Query engine 520 processes queries and stores results in RAM 920. Representation loader 580 processes and stores working format of representations in RAM 920. The stored representations are used by display driver 660 as explained in reference to step 760 and are sent to the display driver 660.

Figure 20:
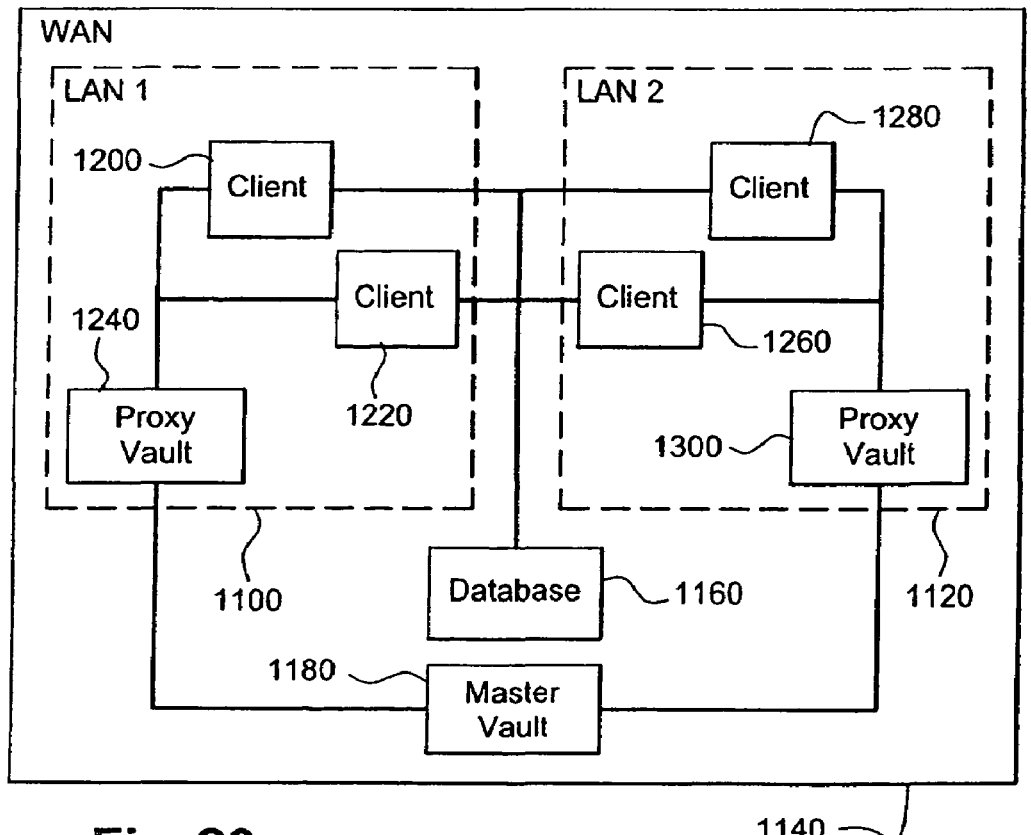
FIG. 20 is a schematic view of a network architecture adapted for carrying out the invention.

FIG. 20 is a schematic view of a network architecture adapted for carrying out the invention; the architecture of FIG. 20 is adapted for allowing various users to navigate, thanks to a common vault server providing a generally accessible database of representations and thanks to a common database server. In the example of FIG. 20, two local area networks 1100 and 1120 are connected in a wide area network 1140. FIG. 20 shows database 1160 and master vault 1180, which are depicted in WAN 1140, for access from LANs 1100 and 1120. First LAN 1100 comprises two clients 1200 and 1220, as well as a proxy vault 1240. Second LAN 1120 also comprises two clients 1260 and 1280 and a proxy vault 1300. The master vault 1180 is replicated in each proxy vault 1240, 1300, to optimize WAN bandwidth usage.

In operation, clients in one of LANs 1100 and 1120 access database 1160 through WAN 1140. Clients 1200 and 1220 in first LAN 1100 access proxy vault 1240 for getting representations, while clients 1260 and 1280 in second LAN 1120 access proxy vault 1300 for getting representations. This exemplary operation assumes that queries to the database 1160—which are mostly text queries, as discussed above in reference to PLM solutions—may be served within WAN. WAN thus has sufficient bandwidth for serving requests to database 1160. Since database 1160 may be updated by any of the clients, the solution of FIG. 20 is simpler than managing data update in various database proxies. The operation of FIG. 20 optimizes WAN bandwidth usage, by replicating vault server 1180 into proxy vaults 1240 and 1300. This is advantageous, since representations of data will typically have a larger size than database information; in addition, representations are pre-computed, and need not be updated, contrary to database information.

The invention is not limited to the preferred embodiments described in reference to the drawings. Notably, the words "first", "second" and "third" data or relation are used for the sake of clarifying the description and do not represent any actual qualification of the data and relations.

Examples of views are provided in FIGS. 1-16. One may use other examples of layouts. FIGS. 17, 19 and 20 suggested preferred architectures; one may also use other software or hardware solutions.

The invention claimed is:

1. A product lifecycle management system, comprising:
a database storing modeled objects and relations between said objects; and
a graphical user interface suitable for displaying to a user a graphical representation of a hierarchy of modeled objects stored in said database;
wherein the graphical user interface is adapted, upon selection of a displayed object from said modeled objects by a user, to display modeled objects stored in said database related to the selected object;
wherein, at a given level in the hierarchy, displayed modeled objects are distributed according to a respective weight; and
wherein the weight of a displayed object depends on the number of descendants of said object in the hierarchy which are displayed in said graphical representation.

2. The system of claim 1, wherein the graphical user interface is adapted to display a graphical cue representative of a hierarchy of a displayed object and the descendants of said object in the hierarchy, which are displayed in said graphical representation.

3. The system of claim 1, wherein the displayed objects have a rendering size depending on their respective weight.

4. The system of claim 1, wherein the weight of a displayed object depends on the size of descendants of said object in the hierarchy, which are displayed in said graphical representation.

5. The system of claim 1, wherein the graphical user interface is adapted to display the objects using a unique scale for all objects.

6. The system of claim 1, wherein the graphical user interface is adapted to display a 3D representation of objects.

7. The system of claim 1, wherein the graphical user interface is adapted, upon selection of a displayed object by a user, for morphing from a first representation of the displayed object to a representation of objects related to the displayed object.

8. A method for navigating in a database of a product lifecycle management system with a computer system comprising one or more computer processors, said database storing modeled objects and relations between said objects, the product lifecycle management system also comprising a graphical user interface suitable for displaying to a user a graphical representation of a hierarchy of modeled objects stored in said database, the method comprising the steps of:
selecting with one of said computer processors a first object from said modeled objects and a first relation from said relations;
finding with one of said computer processors descendants of said first object in the hierarchy, which descendants comprise second objects from said modeled objects related to the first object according to the first relation;
displaying with one of said computer processors a representation of the first object comprising the second objects;
selecting with one of said computer processors one of the displayed second objects and a second relation from said relations;
finding with one of said computer processors descendants of the selected second object, which descendants comprise third objects from said modeled objects related to the selected second object through the second relation; and
displaying with one of said computer processors a representation of the first object, comprising the second and third objects;
wherein:
objects displayed are distributed according to a respective weight; and
the weight of an object depends on the number of descendants of said object in the hierarchy, which are displayed in said graphical representation.

9. The method of claim 8, wherein objects are displayed as 3D objects.

10. The method of claim 9, wherein the relations comprise at least two of the following relations:
a relation "is comprised of",
a relation "where used",
a relation "in contact with";
a relation "in clash with"; and
a relation "impact with".

11. The method of claim 9, further comprising a step of computing and storing 3D representations of objects.

12. The method of claim 8, wherein the step of selecting a first object and a first relation comprises selecting a first layout, and wherein the representation of second objects is a representation in the first layout.

13. The method of claim 8, wherein the step of selecting one of the displayed objects and a second relation comprises selecting a second layout, and wherein the representation of third objects is a representation in the second layout.

14. A computer-readable data storage medium comprising storage instructions for navigating in a database of a product lifecycle management system with a computer system comprising one or more computer processors, said database storing modeled objects and relations between said objects, the product lifecycle management system also comprising a graphical user interface suitable for displaying to a user a graphical representation of a hierarchy of modeled objects stored in said database, wherein when said instructions are executed by a computer, they cause the computer processor to:
- select a first object from said modeled objects and a first relation from said relations;
- find descendants of said first object in the hierarchy, which descendants comprise second objects from said modeled objects related to the first object according to the first relation;
- display a representation of the first object comprising the second objects;
- select one of the displayed second objects and a second relation from said relations;
- find descendants of the selected second object, which descendants comprise third objects from said modeled objects related to the selected second object through the second relation; and
- display a representation of the first object, comprising the second and third objects;
- wherein:
- objects displayed are distributed according to a respective weight;
- the weight of an object depends on the number of descendants of said object in the hierarchy, which are displayed in said graphical representation; and
- wherein the objects are displayed as 3D objects.

15. A product lifecycle management system, comprising:
a database storing modeled objects and relations between said objects; and
a graphical user interface suitable for displaying to a user a 3D graphical representation of a hierarchy of modeled objects stored in said database;
wherein the graphical user interface is adapted, upon selection of a displayed modeled object stored in said database by a user, to display modeled objects stored in said database related to the selected object, using a unique scale for all objects and to morph from a first representation of the displayed object to a representation of modeled objects stored in said database related to the displayed object;
wherein, at a given level in the hierarchy, displayed modeled objects are distributed according to a respective weight;
wherein the weight of a displayed modeled object depends on the number of descendants of said object in the hierarchy which are displayed in said graphical representation;
wherein the graphical user interface is adapted to display a graphical cue representative of a hierarchy of a displayed modeled object and the descendants of said object in the hierarchy, which are displayed in said graphical representation;
wherein the displayed objects have a rendering size depending on their respective weight; and
wherein the weight of a displayed object depends on the size of descendants of said object in the hierarchy, which are displayed in said graphical representation.

16. A method for navigating in a database of a product lifecycle management system with a computer system comprising one or more computer processors, said database storing modeled objects and relations between said objects, the product lifecycle management system also comprising a graphical user interface suitable for displaying to a user a graphical representation of a hierarchy of modeled objects stored in said database, the method comprising the steps of:
- selecting with one of said computer processors a first object from said modeled objects and a first relation from said relations;
- finding with one of said computer processors descendants of said first object in the hierarchy, which descendants comprise second objects from said modeled objects related to the first object according to the first relation;
- displaying with one of said computer processors a representation of the first object comprising the second objects;
- selecting with one of said computer processors one of the displayed second objects and a second relation from said relations;
- finding with one of said computer processors descendants of the selected second object, which descendants comprise third objects from said modeled objects related to the selected second object through the second relation from said relations; and
- displaying with one of said computer processors a representation of the first object, comprising the second and third objects;
- wherein:
- objects displayed are distributed according to a respective weight;
- the weight of an object depends on the number of descendants of said object in the hierarchy, which are displayed in said graphical representation;
- wherein the step of selecting a first object and a first relation comprises selecting a first layout, and wherein the representation of second objects is a representation in the first layout;
- wherein the first layout is selected among:
  - linear layout, with objects represented in perspective view exploded along a line;
  - in-place layout;
  - circular layout, with objects represented in exploded perspective distributed on a disk; and
  - 2D layout of 3D miniature representations.

17. A product lifecycle management system, comprising:
a database storing modeled objects and relations between said objects; and
a graphical user interface suitable for displaying to a user a graphical representation of a hierarchy of modeled objects stored in said database;
wherein the graphical user interface is adapted, upon selection of a displayed modeled object stored in said database by a user, to display modeled objects related to the selected object;
wherein, at a given level in the hierarchy, displayed modeled objects are distributed according to a respective weight; and
wherein the weight of a displayed modeled object depends on the number of descendants of said object in the hierarchy which are displayed in said graphical representation;
wherein selection of a displayed modeled object includes selecting a layout, and wherein the representation of displayed modeled objects is a representation in the layout;
wherein the layout is selected among:
  linear layout, with objects represented in perspective view exploded along a line;
  in-place layout;

circular layout, with objects represented in exploded perspective distributed on a disk; and 2D layout of 3D miniature representations.

18. A product lifecycle management system comprising:
a database storing modeled objects and relations between said objects;
a graphical user interface suitable for displaying to a user a graphical representation of a hierarchy of modeled objects stored in said database;
a processor adapted to carry out a method for navigating said database, the method comprising the steps of:
selecting a first object and a first relation;
finding descendants of said first object in the hierarchy, which descendants comprise second objects related to the first object according to the first relation;
displaying a representation of the first object comprising the second objects;
selecting one of the displayed second objects and a second relation;
finding descendants of the selected second object, which descendants comprise third objects related to the selected second object through the second relation; and
displaying a representation of the first object, comprising the second and third objects;
wherein:
objects displayed are distributed according to a respective weight;
the weight of an object depends on the number of descendants of said object in the hierarchy, which are displayed in said graphical representation;
wherein the step of selecting a first object and a first relation comprises selecting a first layout, and wherein the representation of second objects is a representation in the first layout;
wherein the first layout is selected among:
linear layout, with objects represented in perspective view exploded along a line;
in-place layout;
circular layout, with objects represented in exploded perspective distributed on a disk; and
2D layout of 3D miniature representations.

19. A computer-readable storage medium storing instructions that, when executed by a computer, cause the computer to perform a method of navigating in a database of a product lifecycle management system, the database storing modeled objects and relations between said objects, the product lifecycle management system comprising a graphical user interface suitable for displaying to a user a graphical representation of a hierarchy of objects stored in said database, the method comprising the steps of:
selecting a first object from said modeled objects and a first relation from said relations;
finding descendants of said first object in the hierarchy, which descendants comprise second objects related to the first object according to the first relation;
displaying a representation of the first object comprising the second objects;
selecting one of the displayed second objects and a second relation from said relations;
finding descendants of the selected second object, which descendants comprise third objects from said modeled objects related to the selected second object through the second relation; and displaying a representation of the first object, comprising the second and third objects;
wherein:
objects displayed are distributed according to a respective weight;
the weight of an object depends on the number of descendants of said object in the hierarchy, which are displayed in said graphical representation;
wherein the step of selecting a first object and a first relation comprises selecting a first layout, and wherein the representation of second objects is a representation in the first layout;
wherein the first layout is selected among:
linear layout, with objects represented in perspective view exploded along a line;
in-place layout;
circular layout, with objects represented in exploded perspective distributed on a disk; and
2D layout of 3D miniature representations.

20. A method for navigating in a database of a product lifecycle management system with a computer system comprising one or more computer processors, said database storing modeled objects and relations between said objects, the product lifecycle management system also comprising a graphical user interface suitable for displaying to a user a graphical representation of a hierarchy of modeled objects stored in said database, the method comprising the steps of:
selecting with one of said computer processors a first object from said modeled objects and a first relation from said relations;
finding with one of said computer processors descendants of said first object in the hierarchy, which descendants comprise second objects from said modeled objects related to the first object according to the first relation;
displaying with one of said computer processors a representation of the first object comprising the second objects;
selecting with one of said computer processors one of the displayed second objects and a second relation from said relations;
finding with one of said computer processors descendants of the selected second object, which descendants comprise third objects from said modeled objects related to the selected second object through the second relation; and
displaying with one of said computer processors a representation of the first object, comprising the second and third objects;
wherein:
objects displayed are distributed according to a respective weight;
the weight of an object depends on the number of descendants of said object in the hierarchy, which are displayed in said graphical representation;
wherein the step of selecting a first object and a first relation comprises selecting a first layout, and wherein the representation of second objects is a representation in the first layout; and
wherein the first layout is animated.

* * * * *